US008322420B2

(12) United States Patent
Parlar et al.

(10) Patent No.: US 8,322,420 B2
(45) Date of Patent: *Dec. 4, 2012

(54) TOE-TO-HEEL GRAVEL PACKING METHODS

(75) Inventors: Mehmet Parlar, Sugar Land, TX (US); Raymond Tibbles, Kuala Lumpur (MY); Balkrishna Gadiyar, Katy, TX (US); Bryan Stamm, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 331 days.

This patent is subject to a terminal disclaimer.

(21) Appl. No.: 12/569,983

(22) Filed: Sep. 30, 2009

(65) Prior Publication Data

US 2010/0096130 A1 Apr. 22, 2010

Related U.S. Application Data

(60) Provisional application No. 61/106,929, filed on Oct. 20, 2008.

(51) Int. Cl.
*E21B 43/04* (2006.01)
*E21B 21/00* (2006.01)

(52) U.S. Cl. ..................... 166/278; 166/372
(58) Field of Classification Search .................. None
See application file for complete search history.

(56) References Cited

U.S. PATENT DOCUMENTS

| | | | | |
|---|---|---|---|---|
| 4,945,991 | A * | 8/1990 | Jones ............................. | 166/278 |
| 4,945,994 | A | 8/1990 | Stagg | |
| 5,320,178 | A | 6/1994 | Cornette | |
| 5,320,789 | A | 6/1994 | Nishi et al. | |
| 5,551,516 | A | 9/1996 | Norman et al. | |
| 5,964,295 | A | 10/1999 | Brown et al. | |
| 5,979,555 | A | 11/1999 | Gadberry et al. | |
| 5,979,557 | A | 11/1999 | Card et al. | |
| 6,140,277 | A | 10/2000 | Tibbles et al. | |
| 6,220,345 | B1 | 4/2001 | Jones et al. | |
| 6,258,859 | B1 | 7/2001 | Dahayanake et al. | |
| 6,355,600 | B1 | 3/2002 | Norfleet | |
| 6,435,277 | B1 | 8/2002 | Qu et al. | |
| 6,450,260 | B1 * | 9/2002 | James et al. ................... | 166/277 |
| 6,509,301 | B1 | 1/2003 | Vollmer | |
| 6,569,814 | B1 | 5/2003 | Brady et al. | |
| 6,631,764 | B2 * | 10/2003 | Parlar et al. ................... | 166/278 |
| 6,638,896 | B1 | 10/2003 | Tibbles et al. | |
| 6,660,693 | B2 | 12/2003 | Miller | |
| 6,695,054 | B2 | 2/2004 | Johnson et al. | |
| 6,703,352 | B2 | 3/2004 | Dahayanake et al. | |
| 6,883,608 | B2 * | 4/2005 | Parlar et al. ................... | 166/278 |
| 7,066,284 | B2 | 6/2006 | Wylie et al. | |
| 7,225,879 | B2 | 6/2007 | Wylie et al. | |
| 7,250,390 | B2 | 7/2007 | Patel et al. | |
| 7,341,117 | B2 | 3/2008 | Wylie et al. | |
| 7,373,978 | B2 * | 5/2008 | Barry et al. ................... | 166/278 |
| 7,419,004 | B2 | 9/2008 | Salamat et al. | |
| 2001/0036905 | A1 | 11/2001 | Parlar et al. | |
| 2003/0236174 | A1 * | 12/2003 | Fu et al. ......................... | 507/200 |
| 2004/0014606 | A1 * | 1/2004 | Parlar et al. ................... | 507/100 |
| 2005/0028978 | A1 | 2/2005 | Parlar et al. | |
| 2005/0161219 | A1 | 7/2005 | Hossaini et al. | |
| 2008/0110618 | A1 | 5/2008 | Quintero et al. | |
| 2008/0128129 | A1 | 6/2008 | Yeh et al. | |
| 2009/0065207 | A1 | 3/2009 | Shenoy et al. | |
| 2009/0133875 | A1 * | 5/2009 | Tibbles et al. ................. | 166/278 |
| 2010/0044040 | A1 | 2/2010 | Parlar et al. | |

FOREIGN PATENT DOCUMENTS

| | | |
|---|---|---|
| GB | 2420808 | 6/2006 |
| WO | 2004079145 | 9/2004 |
| WO | 2007092082 | 8/2007 |
| WO | 2010010539 | 1/2010 |

OTHER PUBLICATIONS

Ali, Syed and Griffith, George, "Synthetic Drill-in Fluid for GP Depleted Sands and Pressured Shale." Petroleum Engineer International, Mar. 1999. pp. 31-36.
SPE 64410—Tibbles, R. et. al.; Design and Execution of a 3000-ft Horizontal Gravel-Packed Completion (A Kazakhstan Case History) Oct. 16-18, 2000. Society of Petroleum Engineers Inc.
SPE 86532—Hurst, G. et al.; Alternate Path Completions: A Critical Review and Lessons Learned From Case Histories with Recommended Practices for Deepwater Aoplications. Feb. 18-20, 2004, Society of Petroleum Engineers Inc.
SPE 89815—Parlar, M. et al.; Gravel Packing Wells Drilled with Oil-Based Fluids: A Critical Review of Current Practices and Recommendations for Future Applications. Sep. 26-29, 2004, Society of Petroleum Engineers Inc.
SPE 90758 Hecker, M.T. et al.; Reducing Well Cost by Gravel Packing in Nonaqueous Fluid. Sep. 26-29, 2004, Society of Petroleum Engineers Inc.
SPE 98146—Powers, B.S. et al.; A Critical Review of Chirag Field Completions Performance-Offshore Azerbaijan B. Feb. 15-17, 2006, Society of Petroleum Engineers Inc.
SPE 107297—Whaley, K. et al.; Greater Plutonio Openhole Gravel-Pack Completions: Fluid Design and Field Applications. May 30-Jun. 1, 2007, Society of Petroleum Engineers Inc.

* cited by examiner

*Primary Examiner* — Shane Bomar
*Assistant Examiner* — Silvana Runyan
(74) *Attorney, Agent, or Firm* — David G. Matthews; Rodney Warfford; Daniel Lundeen

(57) ABSTRACT

Gravel packing of a wellbore penetrating a subterranean formation is carried out in a wellbore having a cased section and an uncased section that contains water-based drilling fluids. A first water-based displacement fluid that contains a shale inhibitor is introduced into the wellbore to displace the water-based drilling fluids from the uncased section of the wellbore. A second water-based displacement fluid is introduced into the wellbore to displace fluids within the cased section of the wellbore. A sand control screen assembly is run to a selected depth within the uncased section of the wellbore to facilitate a gravel packing operation. A gravel pack slurry containing gravel and a viscosified carrier fluid is introduced into the wellbore to facilitate gravel packing of the uncased section. The gravel packing operation may be carried without the use of shunt flow paths and with the use of a sand screen assembly having at least one diverter valve to divert fluid returns to facilitate prevention of pressure build up.

23 Claims, No Drawings

TOE-TO-HEEL GRAVEL PACKING METHODS

CROSS-REFERENCE TO RELATED APPLICATIONS

This application claims the benefit of U.S. Provisional Patent Application No. 61/106,929, filed Oct. 20, 2008, which is incorporated herein by reference in its entirety.

BACKGROUND

The statements in this section merely provide background information related to the present disclosure and may not constitute prior art.

Many wells, especially in oil fields in deep-water/subsea environments, are completed as open holes that are uncased at the producing section of the well. Because of the extremely high cost of intervention and high production rates, these wells require a reliable completion technique that prevents sand production and maximizes productivity throughout the entire life of the well. One such technique is open-hole gravel packing.

There are two principal techniques used for gravel packing open holes: (1) the alternate path technique and (2) the water packing technique. The latter uses low-viscosity fluids, such as aqueous completion brines to carry the gravel from the surface and deposit it into the annulus between a sand-control screen and the wellbore. The alternate path technique (discussed at least in part in SPE Paper 86532, on the other hand, utilizes viscous carrier fluids. Therefore the packing mechanisms of these two techniques are significantly different. The alternate path technique allows bypassing of any bridges that may form in the annulus, caused by, for example, high leakoff into the formation due to filtercake erosion, or exceeding the fracturing pressure, or shale-sloughing/shale-swelling or localized formation collapse on the sand control screens.

Most of the recently discovered deep-water fields contain a high fraction of shales, which are water-sensitive, although many have been gravel packed with water-based fluids. A very large fraction of them have been completed with viscous fluids using the alternate path technique. Viscoelastic surfactant (VES) solutions have been the most widely used carrier fluid in open hole gravel packing with the alternate path technique due to their low formation and gravel pack damage characteristics, their low drawdown requirements, their capability of incorporating filtercake cleanup chemicals into the carrier fluid, and their low friction pressures.

While the above-described methods may be adequate for installing sand screens and gravel packing in many wells formed in reactive shale-containing formations, improvements are needed.

SUMMARY

In a first aspect, some embodiments are methods involving providing a wellbore having a cased section and an uncased section, wherein the wellbore contains water-based drilling fluids, introducing a first water-based displacement fluid that contains a shale inhibitor into the wellbore to displace the water-based drilling fluids from the uncased section of the wellbore, introducing a second water-based displacement fluid into the wellbore to displace fluids within the cased section of the wellbore, running a sand control screen assembly to a selected depth within the uncased section of the wellbore to facilitate a gravel packing operation and introducing a gravel pack slurry containing gravel and a viscosified carrier fluid into the wellbore to facilitate gravel packing of the uncased section. In some cases, the second water-based displacement fluid may contain a shale inhibitor. The gravel packing slurry may be introduced into the wellbore without or with the use of shunt flow paths. Also, the sand control screen assembly may include at least one diverter valve to divert fluid returns to facilitate prevention of pressure build up.

Any suitable the shale inhibitor may be used, including at least one of an acrylamide-based polymer, a lignosulfonate, a glycol, a polyol and an amine. The first and/or the second water-based displacement fluid may be a brine. Optionally, the first and the second water-based displacement fluids may contain potassium chloride.

In some cases, the carrier fluid of the gravel slurry has a sufficient viscosity such that less than 20% of the gravel within the slurry settles under static settling test conditions when the slurry temperature is approximately equivalent with the bottom hole temperature.

Some other embodiments are methods of gravel packing a wellbore penetrating a subterranean formation, where the wellbore has a cased section and an uncased section and containing water-based drilling fluids, where the method includes introducing a first water-based displacement fluid containing a shale inhibitor into the wellbore to displace the water-based drilling fluids from the uncased section of the wellbore, introducing a second water-based displacement fluid into the wellbore to displace fluids within the cased section of the wellbore, the second waterbased displacement fluid containing a shale inhibitor that is the same or different from that contained in the first water-based displacement fluid, the shale inhibitor of the first and second water-based displacement fluids being comprised of at least one of the shale inhibitor is comprised of at least one of an acrylamide-based polymer, a lignosulfonate, a glycol, a polyol and an amine, running a sand control screen assembly to a selected depth within the uncased section of the wellbore to facilitate a gravel packing operation, introducing a gravel pack slurry containing gravel and viscosified carrier fluid into the wellbore to facilitate gravel packing of the uncased section, the carrier fluid being viscosified with at least one of a polymer viscosifier and a viscoelastic surfactant, and where the wellbore has a bottom hole temperature, and wherein the carrier fluid of the slurry has a sufficient viscosity such that less than 20% of the gravel within the slurry settles under static settling test conditions when temperature of the slurry is approximately equivalent with the bottom hole temperature. At least one of the first and second water-based displacement fluids is a brine. The carrier fluid may also contain a shale inhibitor. The gravel packing slurry may be introduced into the wellbore without or with the use of shunt flow paths. Also, the sand control screen assembly may include at least one diverter valve to divert fluid returns to facilitate prevention of pressure build up.

In yet some other aspects, embodiments include providing a wellbore having a cased section and an uncased section, wherein the wellbore contains water-based drilling fluids, introducing a first water-based displacement fluid into the wellbore to displace the water-based drilling fluids from the uncased section of the wellbore, introducing a second water-based displacement fluid into the wellbore to displace fluids within the cased section of the wellbore, running a sand control screen assembly to a selected depth within the uncased section of the wellbore to facilitate a gravel packing operation, and introducing a gravel pack slurry containing gravel and a viscosified carrier fluid into the wellbore to facilitate gravel packing of the uncased section. The sand control screen assembly may include at least one diverter valve incorporated into the assembly. A shale inhibitor may be incorporated into at least one of the water-based drilling fluid, the first water-based displacement fluid, the second water-based displacement fluid, the gravel pack slurry, the carrier fluid, a preflush fluid, and a postflush fluid.

DETAILED DESCRIPTION

The description and examples are presented solely for the purpose of illustrating the different embodiments of the invention and should not be construed as a limitation to the scope and applicability of the invention. While any compositions of the present invention may be described herein as comprising certain materials, it should be understood that the composition could optionally comprise two or more chemically different materials. In addition, the composition can also comprise some components other than the ones already cited. While the invention may be described in terms of treatment of vertical wells, it is equally applicable to wells of any orientation. The invention will be described for hydrocarbon production wells, but it is to be understood that the invention may be used for wells for production of other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, if is to be understood that the inventors appreciate and understand that any and all data points within the range are to be considered to have been specified, and that the inventors have possession of the entire range and all points within the range.

The present invention is directed toward novel techniques used for gravel packing and installing sand control screens in a wellbore that may contain water-based drilling muds or fluids and that may contain reactive shale or clay. As used herein, the expressions "reactive shale" or "reactive clay" or similar expressions may be used interchangeably and refer to those shale or clay materials that may swell, crumble, particalize, flake, slough off or otherwise deteriorate when exposed to aqueous fluids, particularly fresh water.

As used herein, the expressions "drilling muds," "drilling fluids" or similar expressions may be used interchangeably and are meant to encompass those fluids used during the drilling of a wellbore. Water-based drilling fluids are typically comprised of an aqueous carrier fluid along with other additives. These additives may include polymers or starch additives, various salts, clay, weighting agents, bridging agents, etc. Most commonly calcium carbonate is used as the bridging agent. Sized salt particles may also be used as bridging agents. In such cases, the salt particles are used in a saturated salt solution so that the salt particles do not dissolve.

Water based drilling in reactive shale environments can result in significant wash-outs (hole sections with significantly larger wellbore diameter than the drill bit diameter). In wellbores with long shale sections between the sand regions, this can cause significant contamination (shale concentration in the mud) of the drilling fluid resulting in dump and dilute process to reduce shale content of the mud. In wellbores with relatively short shale sections, contamination can be tolerable. Any unstabilized shales are incorporated in the drilling fluid while drilling and brought back to surface, whereas during prolonged static periods (e.g., during a trip involving pulling out of the hole with drill string and running in with the completion string), the shales may collapse and block the wellbore resulting in inability to run the screens to target depth. Such collapse may also occur after the screens are installed. In this case, the shales collapsed on the screens may block the annulus between the screen and wellbore wall, which can then result in unpacked sections beyond the blockage. Thus, even in cases where drillers can potentially deal with reactive shales, these shales can cause problems during completion. Often, the operators are forced to use water based drilling fluids despite these problems, due to environmental issues, or perception that gravel packing after oil-based drilling is problematic from both gravel placement and formation damage perspectives.

The water-based drilling fluids may be formed entirely from aqueous fluids or may include a non-aqueous oil phase in the form of an emulsion, where the oil component is present as an internal phase within a continuous or external aqueous phase. The aqueous phase may be a brine, saline or salt solution, and may contain emulsifiers for forming the emulsion.

The water-based drilling fluid may also contain a shale inhibitor. These may the same or similar to the shale inhibitors that are described more fully below with respect to the water-based displacement fluids. An example of a water-based drilling fluid for use in shale-containing formations is that described in U.S. Pat. No. 6,544,933 which is herein incorporated by reference in its entirety.

In the drilling of a well, the drilling fluid is typically circulated through the drill string, through the drill bit at the end of the drill string and up through the annulus between the drilled wellbore and drill string. The circulated drilling fluid is used to carry formation rock present as cuttings or drilled solids that are removed from the wellbore as the drilling fluid is circulated back to the surface.

In the construction of the well, a casing may be positioned within a portion of the drilled wellbore and cemented into place. The portion of the wellbore that is not lined with the casing forms the uncased or open hole section where, in the present invention, a sand control screen assembly is placed to facilitate gravel packing for controlling the migration and production of formation sand and to stabilize the formation of the open hole section.

Once the wellbore is drilled and the casing cemented into place, the well may be completed by installing sand screens and gravel packing the open hole section so that produced fluids from the formation are allowed to flow through the gravel pack and sand screen and may be recovered through the wellbore. The open hole section may be any orientation, including vertical and horizontal hole sections. In accordance with the invention, prior to installing sand control screens, the water-based drilling fluid is first displaced from the open hole section to a water-based displacement fluid that contains a shale inhibitor. A second water-based fluid that may optionally contain the same or a different shale inhibitor is then used to displace the fluid in a cased hole section. Sand control screens are then run to target depth. The sand control screen may be a standalone sand screen or an expandable sand screen. After the sand control screen is installed, the well may be gravel packed with a water-based fluid.

The water-based fluids used for the displacement fluids, and for the carrier fluids used in subsequent gravel packing, may be formed from aqueous brines. The aqueous brine is comprised of water and inorganic salts and/or organic salts. The inorganic salts may include monovalent salts of alkali metal halides and divalent salts of alkali earth metal halides. Examples of suitable monovalent salts include sodium, potassium or cesium chloride or bromide. Examples of suitable inorganic divalent salts include calcium halides, for example, calcium chloride or calcium bromide. In particular applications, the aqueous displacement fluid is a brine containing potassium chloride The potassium chloride is particularly well suited and may be used in an amount of about 3% to about 6% or 7% or more by weight. Zinc halides, especially zinc bromide, may also be used. The inorganic salts can be added to the aqueous displacement fluid in any hydration state (i.e. anhydrous, monohydrated, dihydrated, etc.). The aqueous displacement fluid may also comprise an organic salt, such as sodium, potassium or cesium formate, acetate or the like. The amount of salts used may provide a desired density to the displacement fluid, as well as in some cases shale stability. Typically, the water-based displacement fluid will have a density of up to about 19 ppg (2.3 kg/liter).

The salts used in the displacement fluids and in other treatment fluids used may be compatible with the drilling fluid that was used to drill the wellbore or other fluids used in treatment of the well. Thus the salts in the displacement fluid can also be the same as the salts used in the drilling fluid. In embodiments where a zwitterionic surfactant is employed, as is described later on, the electrolyte may also be compatible with the brine.

The water-based displacement fluids and other fluids, such as the water-based drilling fluid already discussed, used in the invention may further contain a shale inhibitor. The shale inhibitor may react with the formation mineralogy to stabilize shales or clays from swelling and prevent further movement or deterioration. The shale inhibitor can also inhibit or prevent damage in the reservoir rock that might otherwise occur due to mobilization of fines, i.e. formation permeability damage due to fines migration to block pores. The amount and type of shale inhibitor used is selected to achieve the desired effect in controlling reactivity of the fluids with the shales and clays. Some examples of shale inhibitors are acrylamide based polymers, lignosulfonates, amines, glycols, polyols and the like, or a combination of such compounds. The shale inhibitors may be used in amounts of from about 0.01% to about 10% by weight of the fluid, more particularly from about 0.4% to about 4% by weight of the fluid, although lesser or greater amounts may be used.

Amine shale inhibitors are particularly well suited for the present invention. The amine shale inhibitors may be organoamine compounds. Examples of suitable organoamine compounds include, but are not necessarily limited to, tetraethylenepentamine, triethylenetetramine, pentaethylenehexamine, triethanolamine, and the like, or any mixtures thereof. When organoamine compounds are used in fluids of the invention, they may be incorporated in an amount from about 0.01% to about 2.0% by weight of the fluid, more particularly, the organoamine compound may be incorporated at an amount from about 0.05 wt % to about 1.0 wt % weight of the fluid. A particularly useful organoamine compound is tetraethylenepentamine, particularly when used with diutan viscosifying agent at temperatures of approximately 150° C. (300° F.).

Other nonlimiting examples of suitable amine shale inhibitors include those disclosed in U.S. Provisional Patent Application Ser. No. 60/971455, filed Sep. 11, 2007, and in corresponding U.S. Pat. App. Pub. No. 2009/0065207, both of which are incorporated herein by reference in their entireties. In some embodiments, the shale inhibitor may be a polyamine of the formula $H_2$—N—R-(0-R')$_x$—$NH_2$ wherein R and R' are divalent hydrocarbyl such as alkylene of from 1 to 6 carbon atoms, e.g. methylene, ethylene, propylene, butylene, pentylene, hexylene, or the like, and x has a value from 1 to 10, or an acid addition product thereof. The shale inhibitor in one embodiment is a poly(oxyalkylene) polyamine. In certain embodiments, R and R' in the above formula are the same or different branched alkylene of 3 to 5 carbon atoms, e.g. 1,2-propylene, 1,2-butylene, 1,3-butylene, 1,2-pentylene, 1,3-pentylene, 1,4-pentylene, etc. In other embodiments, the shale inhibitor is a diamine ether according to the following Formula (1):

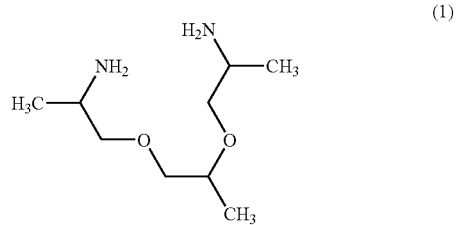

or an acid addition salt thereof.

Glycol or polyol based shale inhibitors may include glycol, alkylene glycols, such as propylene or ethylene glycol, polyalkylene glycols, such as polyethylene glycol, polypropoylene glycol and copolymers of ethylene and propylene glycols, glycerols, etc. Various glycol and polyol shale inhibitors are disclosed in U.S. Pat. No. 6,544,933.

The water-based displacement fluids and other fluids, such as the gravel packing carrier fluids, may also be viscosified with a viscosifying agent. The amount and type of viscosifying agent is selected to provide the desired viscosity or to provide the desired carrying effect for the gravel particles and to ensure efficient return of the carrier fluid. The viscosifying agents may include those described in U.S. Pat. App. Pub. No. 2009/0065207A1, which is herein incorporated by reference.

In some embodiments, the viscosifying agent may be a solvatable or hydratable polymer that is either crosslinked or non-crosslinked (i.e. linear). Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used. Any useful polymer may be used in either crosslinked form, or without crosslinker in linear form. Xanthan, diutan, and scleroglucan, three biopolymers, have been shown to be useful as viscosifying agents. Synthetic polymers such as, but not limited to, polyacrylamide and polyacrylate polymers and copolymers may also be used and are particularly well suited for high-temperature applications.

In various embodiments, the polymer viscosifying agent may be present in an amount of from about 0.1 wt. % to about 1.5 wt. % of total weight of the fluid, from about 0.1 wt. % to about 0.7 wt. % of total weight of fluid, from about 0.1 wt. % to about 0.6 wt. % of total weight of fluid, from about 0.1 wt. % to about 0.5 wt. % of total weight of fluid, from about 0.1 wt. % to about 0.4 wt. % of total weight of fluid, from about 0.1 wt. % to about 0.3 wt. % of total weight of fluid, or even from about 0.1 wt. % to about 0.2 wt. % of total weight of fluid.

In other embodiments of the invention, a viscoelastic surfactant (VES) may be used as a viscosifying agent for the fluids. The VES may be selected from the group consisting of cationic, anionic, zwitterionic, amphoteric, nonionic, and combinations of these. Non-limiting examples include those described in U.S. Pat. Nos. 5,551,516; 5,964,295; 5,979,555; 5,979,557; 6,140,277; 6,258,859; 6,435,277; 6,509,301 and 6,703,352, each of which are incorporated herein by reference. The viscoelastic surfactants, when used alone or in combination with other viscosifying agents, are capable of forming micelles that form a structure in an aqueous environment that contribute to the increased viscosity of the fluid (also referred to as "viscosifying micelles"). These fluids are normally prepared by mixing in appropriate amounts of VES suitable to achieve the desired viscosity. The viscosity of VES fluids may be attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting viscous and elastic behavior.

When a VES is incorporated into the fluids, the amount of the VES can range from about 0.2% to about 15% by weight of total weight of the fluid, more particularly from about 0.5% to about 15% by weight of total weight of fluid, more particularly from about 2% to about 10% by weight of total weight of fluid.

Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described in U.S. Pat. App. Pub. No.2004/0209780A1, incorporated herein by reference.

The viscosified water-based fluids may also be formed from a combination of those hydratable polymers, VES and associative polymers previously described and provided in various amounts and proportions to provide the desired carrier fluid properties.

Other additives used in the water-based fluids may include bridging agents and/or weighting agents, which may include the water-based drilling fluids. Bridging agents may be added to the fluid to bridge across pore throats of exposed rock to facilitate building of a filter cake along the surfaces of the formation to prevent loss of treatment fluids to the formation. The bridging agents may be selected to be removable, such as due to their solubility in certain fluids. Examples of bridging agents may include calcium carbonate, calcium hydroxide, various water soluble salts, soluble polymers (e.g. polylactic acid), waxes, oil-soluble resin, etc. These may be used in an amount of from about 10 lbs/bbl (28.3 kg/m$^3$) to about 30 lbs/bbl (85.2 kg/m$^3$) of the displacement fluid. In some applications, the bridging agent may be used in the first water-based displacement fluid that is used for displacing the open hole section of the well but not for the displacement fluid used in displacing the cased hole section.

Weighting agents may be used to increase the density of the displacement fluids. These materials may be finely divided solid materials that have high specific gravities. Examples of weighting agents may include barite, hematite, siderite, ilmenite, etc. Calcium carbonate may also be used as a weighting agent, in addition to a bridging agent. Barite is a particularly well suited weighting agent, having a minimum specific gravity of 4.2 g/cm$^3$. Weighting agents may be used in varying amounts that provide the desired weighting characteristics to the synthetic/oil-based displacement fluids.

If solids are used in the water-based displacement fluids, such as bridging agents, etc., these may be selected to be sufficiently small so that they readily pass through and do not plug or interfere with the openings of the sand control screen. Typically, such solids will be selected to have a particle size to provide a screen-opening-to-particle-size ratio of about 4:1 to about 6:1 or higher. In some embodiments, the water-based displacement fluid may be substantially free of any solids, including non-drilled solids.

The aqueous displacement fluid may contain various other useful additives, known to those of skill in the art.

Displacement of the water-based drilling fluids from the open hole section may be carried out by introducing the first water-based displacement fluid containing the shale inhibitor into the wellbore by passing the displacement fluid through the tubular drill string to the open hole section. As the water-based displacement fluid is pumped through the drill string, the water-based drilling fluids in the open hole section containing the drilled solids and cuttings are carried upward through the annulus formed by the casing and the drill string. The shale inhibitor of the water-based displacement fluid facilitates maintaining of the integrity of the open hole section, which may contain reactive shales or clays that would otherwise be damaged if no shale inhibitor were used with the displacement fluid to displace the drilling muds or fluids. In certain embodiments, the volume of water-based displacement fluid used is sufficient to displace the open hole section plus the cased hole section up to the packer setting depth. The volume of water-based displacement fluid used may vary, however.

When a sufficient volume of the water-based displacement fluid is introduced into the wellbore to displace the drilling fluid from the open hole section of the wellbore, a second water-based displacement fluid is used to displace at least a portion or all of the cased hole section of the wellbore. In certain embodiments, the volume of the second water-based displacement fluid is sufficient to displace the entire cased section above the packer setting depth. This may be carried out by raising the end of the tubular drill string so that it is positioned within the cased hole section above the open hole section so that the second water-based displacement fluid is discharged from the end of the drill string into the cased hole section.

The second water-based displacement fluid may be the same or similar to the first water-based displacement that is used for displacing the open hole section. The second water-based displacement fluid may be a brine, as described previously. The second water-based displacement fluid may contain no shale inhibitor in certain embodiments. In other embodiments, the second water-based displacement fluid may contain a shale inhibitor that is the same or different than that used in the first water-based displacement fluid with the shale inhibitor being used in the same or different amounts to that of the first water-based displacement fluid. In certain embodiments, the amount of shale inhibitor in the second water-based displacement fluid may be less than that used in the first displacement for the open hole section.

The second water-based displacement fluid may contain the same or similar additives to the first water-based displacement fluid, such as surfactants, shale stabilizers, non-emulsifiers, viscosifiers, bridging agents, weighting agents, etc., as those previously described.

The use of the water-based displacement fluids in the open and cased hole sections, respectively, facilitates the removal of solids present in the drilling fluids that could otherwise clog the sand screens. Additionally, the use of the shale inhibitors in the displacement fluid in the open hole section prevents the reactive shales and clay materials in the open hole section from swelling, collapsing or otherwise deteriorating and thus preventing sand screens from being lowered to the desired position within the well bore. This may eliminate the need for the use of a liner, as may be used in prior art methods. Because the second water-based displacement fluid is located substantially within the casing, the fluid is isolated from the open hole section, so there may be no or little potential for damage to the reactive materials of the formation from these fluids if no shale inhibitor or lesser amounts are used in this fluid.

The displacement method of the invention can be used with almost any type of sand control screen assembly. These may include wire-wrapped screens, prepacked screens, direct-wrapped sand screens, mesh screens, premium-type screens, etc. Premium-type screens typically consist of multi-layers of mesh woven media along with a drainage layer. Premium-type screens do not have a well defined screen opening size. In contrast, wire wrap screens consist of wire uniformly wrapped around a perforated base pipe. The wire wrap screens have a relatively uniform screen opening defined as gauge opening. The sand control screen assembly may also be an expandable sand screen. An example of expandable sand screen that may be used in the present invention is that described in U.S. Pat. No. 6,695,054, which is hereby incorporated herein by reference.

The sand control screen assembly may also include those with alternate flow paths or shunt tubes, such are used with viscosified gravel packing slurries. As discussed more fully below, however, the invention allows the introduction of a viscosified gravel packing slurry that does not make use of shunt tubes or alternate flow paths, as has been required in prior art methods, such as those disclosed in SPE Paper 86532. Such alternate flow paths or shunt tubes are typically in the form of one or more tubes or conduits that are provided on the exterior of the screens. The tubes or conduits provide annular passageways to allow the passage of the gravel packing slurry past any annular blockages. Holes or openings are provided on the tubes or conduits to allow the slurry to exit the passageways at selected positions within the annulus. As used herein, the expressions "shunt flow tube," "shunt flow path," "alternate flow path," and similar expressions are meant to encompass those flow paths for fluid flow formed in the annulus exterior to the screen of the screen assembly to bypass annular blockages, such as those caused by fluid loss from the gravel packing.

The screen assemblies may include those that include one or more diverter valves, which may be located along the wash pipe for diverting fluid returns through a shorter pathway, preventing pressure build up during the gravel packing process. This facilitates the use of viscosified gravel packing slurries in toe-to-heel gravel packing operations without the use of shunt tubes. Screen assemblies that employ diverter valves may be those that do not utilize shunt tubes or alternate flow paths. Examples of sand control screens that employ diverter valves that may be suitable for the method of the invention are those described in U.S. Pat. App. Pub. No. 2009/0133875A1, which is herein incorporated by reference in its entirety. Such diverter valves have typically been used in screen assemblies using alpha/beta wave water pack fluids in horizontal gravel packing operations, wherein the lower side of the screen is packed from heel to toe in the alpha wave and the upper side is packed from toe to heel in the beta wave.

After the open hole and cased hole sections are displaced with the respective water-based displacement fluids, the drilling string may be removed from the wellbore and the desired sand control screen assembly may be run or lowered to a selected depth within the open hole section of the well bore. As discussed, the sand control screen assembly may be one that does not incorporate or include shunt tubes or alternate flow paths. The sand screen assembly may be run or lowered into the wellbore on a tubular member or wash pipe, which is used for conducting fluids between the sand screen and the surface. Running the sand screen assembly to the selected depth may include positioning the sand screen in vertical or non-vertical (horizontal) sections of the well. A packer assembly may be positioned and set in the casing above the sand screen to isolate the interval being packed. A crossover service tool or assembly may also be provided with the sand control screen assembly to selectively allow fluids to flow between the annulus formed by the open hole and the screen assembly and the interior of the tubular member and wash pipe.

With the sand control screen assembly in place, a gravel pack slurry containing gravel for forming the gravel pack and a water-based carrier fluid is introduced into the wellbore to facilitate gravel packing of the open hole section of wellbore in the annulus surrounding the sand control screen. Gravel packing is sometimes used on unconsolidated formations, which tend to produce an undesirably high level of particulates together with the formation fluids. The method involves the placement of a slurry comprising a quantity of gravel and/or sand having a suitable mesh size into the formation adjacent to the wellbore. It is sometimes desirable to bind the gravel particles together to form a porous matrix for passage of formation fluids while facilitating the filtering out and retention in the well of the bulk of the unconsolidated sand and/or fines transported to the near wellbore area by the formation fluids. The gravel pack slurry is typically introduced into the tubular member where it flows to the cross over tool into the annulus of the open hole section below the packer and the exterior of the sand control screen. As the gravel settles within the open hole section surrounding the screen, the carrier fluid passes through the screen and into the interior of the tubular member or wash pipe. In those embodiments wherein the screen assembly includes diverter valves, at least some carrier fluid may enter the wash pipe through the diverter valves. The carrier fluid from the wash pipe is conducted to the crossover tool and into the annulus between the casing and the tubular member above the packer. Optionally, fluids used in the invention are then removed from the emplaced gravel or sand.

The gravel particles used for gravel packing can be ceramics, natural sand or other particulate materials suitable for such purposes. The gravel particles are sized so that they will not pass through the screen openings. Typical particle sizes in U.S. mesh size may range from about 8 (2.38 mm) or 12 mesh (1.68 mm) to about 70 mesh (0.210 mm). A combination of different particle sizes may be used. Examples of typical particle size combinations for the gravel particles include 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0297 mm), 40/60 mesh (0.420 mm/0.250 mm) and 40/70 mesh (0.420 mm/0.210 mm). The gravel particles may be coated with a resin to facilitate binding of the particles together. The resin-coated particles may be pre-cured or may cure in situ, such as by an overflush of a chemical binding agent or by elevated formation temperatures.

The gravel pack carrier fluid may also be a water-based fluid. The aqueous fluid may be composed of an aqueous completion brine or salt solution and may be the same or similar to those used for the water-based displacement fluids. The gravel packing carrier fluid may contain the same or similar additives used for the water-based displacement fluids. These may include shale inhibitors, bridging agents, weighting agents, etc. The water-based carrier fluid may be viscosified with a polymer viscosifier and/or a viscoelastic surfactant, such as those previously described. In certain embodiments, the carrier fluid of the slurry may have a visocosity of at least about 50 mPa·s at a shear rate of 100 s$^{-1}$. Moreover, the carrier fluid of the gravel packing slurry may have a sufficient viscosity such that less than 20% of the gravel within the slurry settles under static settling test conditions when the slurry is at bottom hole temperatures. Other optional additives may include filter cake clean up reagents, such as chelating agents or acids (e.g. hydrochloric, hydrofluoric, formic, acetic, citric acid), corrosion inhibitors, scale inhibitors, biocides, leak-off control agents, breaker aids, among others. In other embodiments, the carrier fluid may not contain the additives of the displacement fluids, (e.g. no shale inhibitor, etc.) or may contain different additives. Available water, other than brine, may also be used in some embodiments as the carrier fluid.

In one embodiment, a shale inhibitor can be used in a post gravel pack clean up flush, where the gravel pack is otherwise conventional or in accordance with the gravel packing embodiments of the invention just described. In this embodiment, a cleanup flush stage is pumped into the well, the flush stage comprising the inhibitor and additives to dissolve the filter cake, and optionally also comprising a brine such as KCl or tetramethyl ammonium chloride (TMAC) or another clay stabilizer. As the flush stage takes effect, the apparent permeability of the formation increases and a portion of the flush stage fluid leaks off into the formation. The presence of the shale inhibitor in the leakoff fluid allows the formation which is contacted thereby to absorb the inhibitor and reduce the risk of formation damage due to fines migration into the gravel pack, for example, relative to a fluid without any inhibitor, or with only a temporary inhibitor, which might cause a water sensitive formation to have impaired productivity. Another benefit in this embodiment is that the shale inhibitor in the treatment fluid can facilitate stabilization of the borehole, especially in shale and other water-sensitive formations.

The present invention provides a method for installing a sand screen assembly in an open hole section of wellbore in a subterranean formation containing reactive shales or clays. By using a water-based displacement fluid containing shale inhibitor in the open hole section of the well, the drilling fluid can be effectively displaced to remove drilling solids without damaging the formation. A second water-based displacement fluid that may optionally contain a shale inhibitor is used to displace fluids from the cased section of the wellbore. This allows the screen assembly to be run fully to target depth in fluids that do not contain drilled solids and ensures that reactive formation materials do not collapse, swell or otherwise deteriorate that might otherwise prevent the screen assembly from being properly positioned. Once the screen assembly is in place, gravel packing can be carried out to consolidate the formation materials. The screen assembly may be one that does not employ shunt tubes or alternate flow paths. The gravel packing can be carried out with an aqueous carrier fluid containing polymer or VES viscosifying agents, even without the use of shunt tubes or alternate flow paths. The well can then be placed in production with formation fluids flowing through the gravel pack and screen and through the wellbore to the surface.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method comprising:
   providing a wellbore having a cased section and an uncased section, wherein the wellbore contains water-based drilling fluids containing drilled solids;
   introducing a first water-based displacement fluid comprising a shale inhibitor into the wellbore to displace the water-based drilling fluids and drilled solids from the uncased section of the wellbore;
   then introducing a second water-based displacement fluid into the wellbore to displace fluids within the cased section of the wellbore;
   then running a sand control screen assembly through the first water-based displacement fluid, the second water-based displacement fluid or a combination thereof, to a selected depth within the uncased section of the wellbore to facilitate a gravel packing operation; and
   then introducing a gravel pack slurry containing gravel and a viscosified carrier fluid into the wellbore to facilitate gravel packing of the uncased section.

2. The method of claim 1, wherein the second water-based displacement fluid contains a shale inhibitor.

3. The method of claim 1, wherein the shale inhibitor is comprised of at least one of an acrylamide-based polymer, a lignosulfonate, a glycol, a polyol and an amine.

4. The method of claim 1, wherein at least one of the first and the second water-based displacement fluids is a brine.

5. The method of claim 1, wherein at least one of the first and the second water-based displacement fluids contains potassium chloride.

6. The method of claim 1, wherein the wellbore has a bottom hole temperature, and wherein the carrier fluid of the slurry has a sufficient viscosity such that less than 20% of the gravel within the slurry settles under static settling test conditions when the slurry temperature is approximately equivalent with the bottom hole temperature.

7. The method of claim 1, wherein the carrier fluid of the slurry has a minimum visocosity of about 50 mPa·s at a shear rate of 100 s$^{-1}$.

8. The method of claim 1, wherein the carrier fluid is viscosified with at least one of polymer viscosifier and a viscoelastic surfactant.

9. The method of claim 1, wherein the carrier fluid contains a shale inhibitor.

10. The method of claim 1, wherein the gravel packing slurry is introduced into the wellbore without the use of shunt flow paths.

11. The method of claim 1, wherein the sand control screen assembly includes at least one diverter valve to divert fluid returns to facilitate prevention of pressure build up.

12. The method of claim 1, wherein at least one of the first and the second water-based displacement fluids is viscosified.

13. A method of gravel packing a wellbore penetrating a subterranean formation, the wellbore having a cased section and an uncased section and containing water-based drilling fluids containing drilled solids, the method comprising:
   introducing a first water-based displacement fluid comprising a shale inhibitor into the wellbore to displace the water-based drilling fluids and drilled solids from the uncased section of the wellbore;
   then introducing a second water-based displacement fluid into the wellbore to displace fluids within the cased section of the wellbore, the second water-based displacement fluid containing a shale inhibitor that is the same or different from that contained in the first water-based displacement fluid, the shale inhibitor of the first and second water-based displacement fluids being comprised of at least one of the shale inhibitor is comprised of at least one of an acrylamide-based polymer, a lignosulfonate, a glycol, a polyol and an amine;

then running a sand control screen assembly to a selected depth within the uncased section of the wellbore to facilitate a gravel packing operation;

then introducing a gravel pack slurry containing gravel and viscosified carrier fluid into the wellbore to facilitate gravel packing of the uncased section, the carrier fluid being viscosified with at least one of a polymer viscosifier and a viscoelastic surfactant; and, wherein the wellbore has a bottom hole temperature, and wherein the carrier fluid of the slurry has a sufficient viscosity such that less than 20% of the gravel within the slurry settles under static settling test conditions when temperature of the slurry is approximately equivalent with the bottom hole temperature.

14. The method of claim 13, wherein at least one of the first and second water-based displacement fluids is a brine.

15. The method of claim 13, wherein the carrier fluid of the slurry has a minimum viscosity of about 50 mPa·s at a shear rate of 100 s$^{-1}$.

16. The method of claim 13, wherein the carrier fluid is viscosified with at least one of polymer viscosifier and a viscoelastic surfactant.

17. The method of claim 13, wherein the carrier fluid contains a shale inhibitor.

18. The method of claim 13, wherein the gravel packing slurry is introduced into the wellbore without the use of shunt flow paths.

19. The method of claim 13, wherein the sand control screen assembly includes at least one diverter valve to divert fluid returns to facilitate prevention of pressure build up.

20. The method of claim 13, wherein at least one of the first and second water-based displacement fluids is viscosified.

21. A method comprising:

providing a wellbore having a cased section and an uncased section, wherein the wellbore contains water-based drilling fluids containing drilled solids;

then introducing a first water-based displacement fluid into the wellbore to displace the water-based drilling fluids and drilled solids from the uncased section of the wellbore;

then introducing a second water-based displacement fluid into the wellbore to displace fluids within the cased section of the wellbore;

then running a sand control screen assembly through the first water-based displacement fluid, the second water-based displacement fluid or a combination thereof, to a selected depth within the uncased section of the wellbore to facilitate a gravel packing operation; and, then introducing a gravel pack slurry containing gravel and a viscosified carrier fluid into the wellbore to facilitate gravel packing of the uncased section.

22. The method of claim 21, wherein the sand control screen assembly comprises at least one diverter valve incorporated into the assembly.

23. The method of claim 21, wherein a shale inhibitor is incorporated into at least one of the water-based drilling fluid, the first water-based displacement fluid, the second water-based displacement fluid, the gravel pack slurry, the carrier fluid, a preflush fluid, and a postflush fluid.

* * * * *